April 7, 1931.  W. R. BENJAMIN  1,799,947
FOOT PROPELLED VEHICLE
Filed May 4, 1929   2 Sheets-Sheet 1
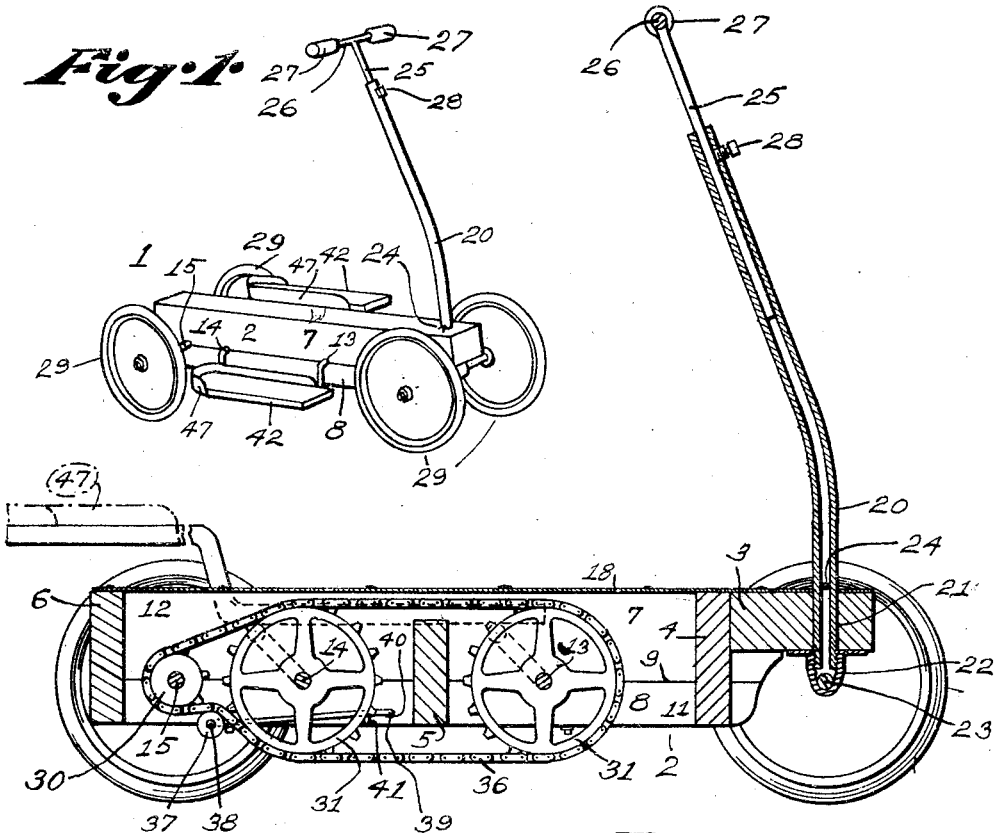
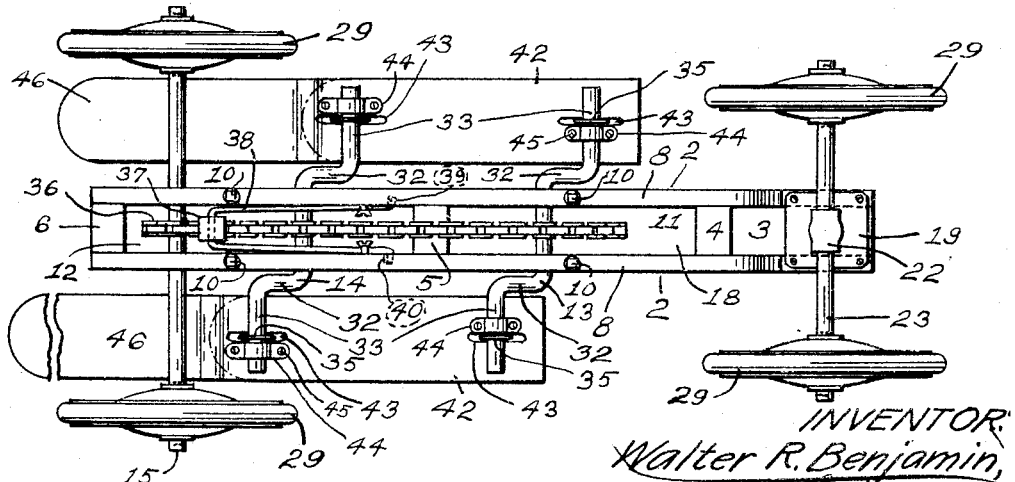
INVENTOR
Walter R. Benjamin,
BY Hugh R. Wagner,
ATTORNEY.

INVENTOR.
Walter R. Benjamin,
BY Hugh K. Wagner,
ATTORNEY.

Patented Apr. 7, 1931

1,799,947

UNITED STATES PATENT OFFICE

WALTER R. BENJAMIN, OF GRANITE CITY, ILLINOIS

FOOT-PROPELLED VEHICLE

Application filed May 4, 1929. Serial No. 360,459.

This invention relates to a foot-propelled child's vehicle; and, in some of its aspects, has reference to improvements limited for use in connection with that form of vehicle described and claimed by the present inventor in United States Patent 1,533,824, issued April 14, 1925, although other features of the invention are capable of a more extended use.

The vehicle of the aforesaid patent consists generally of a box-like body open at the top and having a pair of transverse crank shafts journaled in the side walls of the body and provided with crank portions on the interior of the body and with exterior extensions bearing wheels. The interior of the body contains right and left pedals, whose opposite ends are journaled to corresponding crank portions of the respective crank shafts. Gearing is disposed in the interior of the body between the pedals and connects intermediate crank portions of the respective crank shafts whereby said shafts are maintained in proper angular relation with respect to one another so that the pedals will always be maintained parallel to the surface over which the vehicle travels. The said patent also discloses a modification in which the rear crank shaft is devoid of traction wheels and in which the latter are borne by a separate driving axle connected by separate gearing to the rear crank shaft. All of the aforesaid gearing is exposed and occupies the space not occupied by the pedals, so that there is no room for the feet of the child except on the pedals, and, in order to coast, therefore, special means is, and must be, provided for disconnecting the pedals from their driving connection with the vehicle.

Accordingly, one of the objects of the present invention is to provide a vehicle of this character in which standing room will be provided on the body in the event the child desires to coast, thereby obviating the need for the aforesaid disconnecting mechanism.

Another object of the invention is to provide, in a vehicle of the character described having the aforesaid pair of crank shafts and a separate driving axle, a single sprocket chain for gearing the shafts and axle together, thereby dispensing with the separate gearing between the driving axle and one of the crank shafts, referred to in the aforesaid description of the aforesaid modification in the said patent.

Another object of the invention is to provide a vehicle in which the body is so disposed that it covers and shields the gearing connecting the shafts, thereby rendering the vehicle safer in use than were the gearing exposed as in the vehicle of the prior patent.

Another object of the invention is to form the vehicle body of separable sections that cooperate to hold the several shafts, and that are so arranged that the shafts and gearing can be quickly removed by merely disconnecting the sections from one another.

A further object of the invention is to provide guards on the pedals that will positively prevent the feet of the child thereon from slipping off.

Another object is to provide extensions for the pedals that will accommodate an additional child thereon without having to lengthen the body of the vehicle.

A further object is the provision of a novel connection between the pedals and the crank journals of the crank shafts.

Another object is to provide an improved connection between the front axle and the steering post.

Other objects, advantages, and desirable features of the invention will appear in the course of the following description of an illustrative embodiment of the invention.

In the accompanying drawings, forming part of this specification, in which like numbers of reference denote like parts wherever they occur, Figure 1 is a perspective view of the illustrative embodiment of the invention, showing short pedals;

Figure 2 is a vertical longitudinal central sectional view through the same, but with extended pedals;

Figure 3 is a bottom view of the same;

Figure 4:
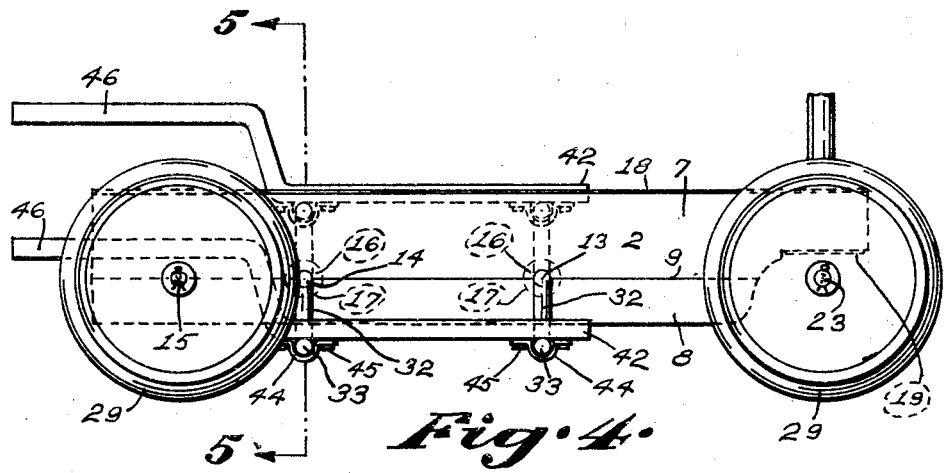
Figure 4 is a side elevation showing the extended pedals in different positions.

The parts of the vehicle may be formed of any suitable materials, but, in the present instance, the body 1 is preferably formed of wood and includes a pair of side walls 2, separated by intermediate spacer blocks 3, 4, 5, and 6. The side walls 2 are formed of separable upper and lower sections 7 and 8, respectively, secured together at their meeting edges 9 by means of lag screws 10 that pass through holes therefor in the lower sections 8 and that screw into the upper sections 7. The lower section 8 is shorter than the upper at the front end of the body in order to accommodate the front axle of the vehicle, and the overhanging front portions of the upper section 7 are secured to the intermediate front horizontally elongated spacer block 3. The vertically elongated next-to-the-front spacer block 4 lies immediately behind the block 3, and the block 4 and the vertically elongated intermediate block 5 and rear block 6 are preferably secured to the lower wall sections 8. Middle block 5 divides the hollow body 1 into compartments 11 and 12. A transverse crank shaft 13 passes through the front compartment 11, and a transverse crank shaft 14 passes through the front portion of the rear compartment 12. The rear or driving axle 15 passes through the rear portion of the compartment 12. Shafts 13, 14, and 15 are carried preferably in ball bearings 16, lodged or seated in recesses or pockets 17, the upper half of each pocket being formed in the upper wall sections 7, and the lower half of each pocket being formed in the lower wall sections 8. A metal plate 18 is preferably suitably secured to the upper edges of the walls 2 to form a cover for the top of the hollow body 1. A metal wearing plate 19 is, also, preferably secured on the underside of the block 3 and the abutting portions of the upper wall sections 7. A steering post 20 is journaled in a vertical bearing 21 extending through the block 3 and the plates 18 and 19. The post 20 is preferably formed of metal tubing or piping preferably having its lower end threading into and welded or brazed to a T-fitting 22, the horizontal branches of which receive the front axle 23, also preferably welded or brazed to the T-fitting 22. The fitting 22, and a cotter pin 24, passing through the tube 20 adjacent the upper face of plate 18, limit vertical movement of the steering post 20 in the bearing 21. A rod 25 is adjustable in the upper end of the tube 20, and has formed integral therewith the transverse handle bar 26, the outer ends of which, may be covered by rubber sleeves or ends 27. A set screw 28 secures the handle 26 at the adjusted height. Wheels 29 are journaled on the outer ends of the front axle 23. The driving axle 15 carries wheels 29 at its outer ends and spaced sufficiently from the opposite sides of the body 1 to allow space between the wheels and the body for the passage of the pedals to be presently referred to. Both wheels 29 may be tight on the axle 15, or one may be tight and one loose to facilitate turning of corners.

Figure 5:
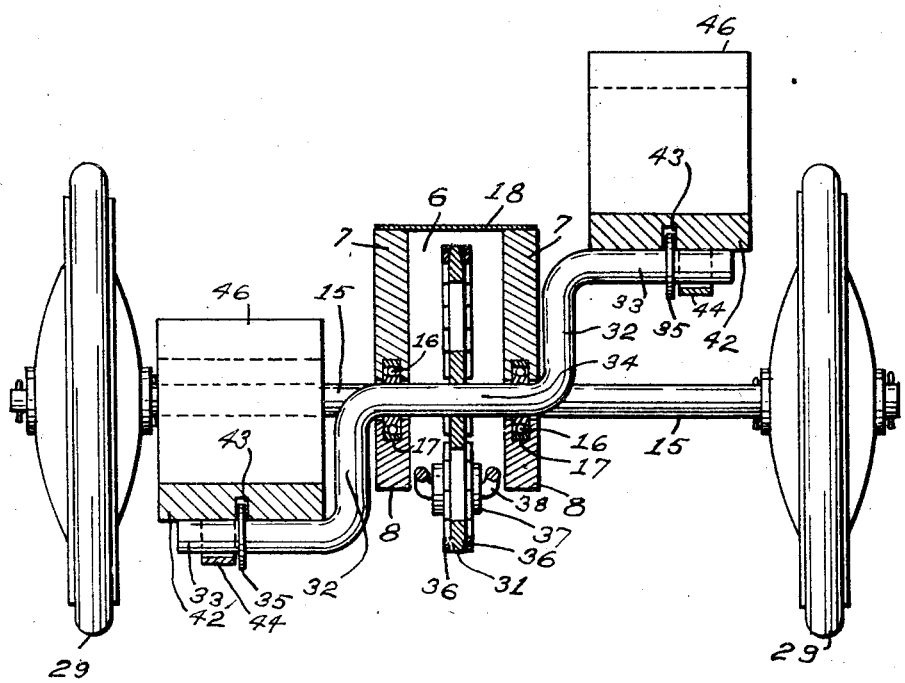
Figure 5 is a transverse vertical sectional view taken on the line 5—5 in Figure 4.

A sprocket wheel 30 is tightly secured to the middle of driving shaft or axle 15 and respective sprocket wheels 31 are tightly secured to the middle of each of the crank shafts 13 and 14, all the sprockets being preferably welded or brazed to their respective shafts. The ball bearings 16 are then positioned on the shafts, and the crank shafts 13 and 14 are then bent into shape, as best shown in Figure 5, to provide oppositely directed crank arms 32 on opposite ends of the crank shafts and pedal journal portions 33 that project exteriorly from the arms 32 and parallel to the intermediate portions 34 of the crank shafts. Annular flanges or collars 35 are next affixed on the intermediate portions of the pedal journals 33, being also preferably welded or brazed thereto. The shafts are then placed in their positions in the body 1, the wall sections 7 and 8 being separated for their admittance and then secured together by means of the screws 10 after the bearings have been positioned in their sockets 17. A sprocket chain 36 is passed around the sprocket wheels 30, 31, and 31, and is kept in proper engagement with the rear sprocket wheel 31 preferably by means of an idler roller 37, journalled on a U-shaped resilient metal rod 38, having outwardly directed ends 39 that seat in sockets 40 therefor in the inner sides of the lower wall sections 8 as best shown in Figure 2. Screws 41 in the inner sides of the lower wall sections 8 engage the lower edges of rod 38 and thereby maintain roller 37 in yielding engagement with chain 36, thereby keeping the latter taut.

The pedals 42 are preferably, though not necessarily, formed of hard wood and are sustained on their undersides at their opposite ends by the corresponding journal ends 33 of the respective crank shafts, and are recessed or slotted on their undersides as at 43 to receive the flanges 35 on said pedal journals 33. The pedals are constrained into proper pivotal relation with the journals 33 by means of rigid straps or bands 44, that underlie the journals 33 and have their ends secured to the undersides of the pedals 42, preferably by means of screws 45. The pedals 42 may be short as shown in Figure 1, or they may be extended rearwardly as shown in Figures 2 to 5, inclusive, the extended portions 46 passing over the rear axle and being upwardly offset or in a higher plane than the forward portions of the pedals, so that the vertical throw of the pedal extensions 46 will not be intercepted by the rear axle 15. The pedals may be provided along their inner and their rear sides with upstanding flanges 47, preferably formed of sheet metal bent to follow the margin of the pedals and nailed or otherwise secured to the inner and rear edges of the pedals, as best shown in Figure 1, and optionally indicated in Figure 2 by means of broken lines. The front and outer edges of the pedals are preferably not provided with flanges in order to enable the child to mount or dismount the pedals with greater facility.

It will be observed that the treadles 42 which give the propelling force are always level or parallel to the roadbed. The child stands flat footed with his entire weight on the treadles, which rest on a pair of double cranks that are held in the same relative position to each other by the driving chain which also eliminates a separate connection to the rear axle. The working parts can be easily removed for repair, if necessary, by simply removing the lag screws 10. The vehicle is absolutely safe, since the gears and chain are all inclosed and the pedals have rear and inside guards to prevent the foot sliding off rearwardly or inwardly and becoming pinched against the cranks. The vehicle is always under the complete control of the operator, an appropriate shift of weight from pedal to pedal stopping the vehicle smoothly and surely. Reversing, the child may back with the same smoothness and power as in going forward. To coast, it is merely necessary to stand on the body that is so conveniently disposed between the pedals for the purpose. The child's weight is so close to the ground that it is nearly impossible for the vehicle to upset. The extended pedals also enable the vehicle to be propelled by more than one child. The bands 44 form a simple and inexpensive means of connecting the pedals to the cranks, and any undue shifting of the pedals 42 along the crank journals 33 is prevented by reason of the engagement of the flanges 35 with the slots 43. A simple means of steering the front axle is provided, and the height of the steering handle 26 may be adjusted to suit the child.

Having thus fully described this invention, I hereby reserve the benefit of all changes in form, arrangement, order, or use of parts, as it is evident that many minor changes may be made therein without departing from the spirit of this invention or the scope of the following claims.

I claim:

1. In a foot-propelled child's vehicle, a body having front and rear axles projecting from opposite sides thereof, wheels on said axles disposed in spaced relation to said body, pedals supported from opposite sides of the vehicle between the front and rear axles so as to maintain said pedals always substantially parallel to the surface over which the vehicle travels, said pedals having a driving connection with the vehicle and an end portion extending over an axle and upwardly offset so that its vertical throw will not be intercepted by the axle.

2. In a foot-propelled child's vehicle, a pedal, and a crank having a journal portion for the pedal and a flange on the said journal portion, the said pedal being journaled on the said journal portion and having a slot to accommodate the flange and to co-operate therewith in limiting movement of the pedal along the journal.

3. In a foot-propelled child's vehicle, a pedal, a crank having a journal portion bearing against the underside of the pedal and a flange on the said journal portion, and means for maintaining the journal portion of the crank in position on the underside of the pedal, the pedal having a slot to receive the flange and to co-operate therewith in limiting movement of the pedal along the journal.

4. In a foot-propelled child's vehicle having a front shaft, a rear shaft, and an intermediate shaft, one of said shafts constituting a driving axle and the other two being crank shafts, pedal means journaled on the cranks of the respective crank shafts and operable to rotate the latter, sprocket wheels affixed to the respective shafts, a sprocket chain connecting the respective sprocket wheels whereby all rotate in a common direction, and an idler journaled intermediary of the intermediate sprocket wheel and an end wheel and engaging the chain to maintain the latter in engagement with the intermediate sprocket wheel.

5. In a foot-propelled child's vehicle having a front shaft, a rear shaft, and an intermediate shaft, one of said shafts constituting a driving axle and the other two being crank shafts, pedal means journaled on the cranks of the respective shafts and operable to rotate the latter, sprocket wheels affixed to the respective shafts, a sprocket chain connecting the sprocket wheels whereby all are rotated in a common direction, and means yieldingly engaging the chain intermediary of the intermediate sprocket wheel and an end sprocket wheel to maintain the chain in engagement with the intermediate sprocket wheel.

6. In a foot-propelled child's vehicle, an elongated body having a series of transverse shafts journaled therein at intervals along its length, one of said shafts being a driving axle and one other, at least, being a crank shaft, pedal means journaled on the crank shaft and operable to rotate the latter, and gearing connecting the crank shaft to the driving axle whereby the former drives the latter, the said elongated body being formed in separable sections, that respectively overlie and underlie the said series of shafts and co-operate to embrace the latter.

7. In a foot-propelled child's vehicle, a body including a pair of oppositely disposed vertical walls extending lengthwise of the vehicle, a series of transverse shafts journaled therein at intervals of their length, one of said shafts being a driving axle bearing wheels exteriorly and another being a crank shaft having cranks at opposite outer sides of the walls, pedals journaled on the cranks and operable to rotate the crank shaft, and means between the walls for transmitting the power of the crank shaft to the driving axle, the said walls being formed in separable sections that respectively overlie and underlie the said shafts and co-operate to embrace the latter.

8. In a foot-propelled child's vehicle, a body, a steering post journaled in the front portion of the body, a fitting carried by the lower end of said post, a front axle borne by the fitting, a rear driving axle journaled in the body, wheels borne by said axles on opposite sides of the body, a transverse crank shaft journaled in the body and having cranks on opposite sides of the body, pedals borne by the cranks and operable to rotate the latter, and a driving connection between the pedals and the driving axle, said driving connection underlying the upper face of said body.

9. In a foot-propelled child's vehicle, a body, a steering post journaled in the front portion of the body, a front axle borne by the steering post, a rear driving axle journaled in the body, wheels borne by said axles on opposite sides of the body, a pair of transverse crank shafts journaled in the body and having cranks on opposite sides of the body, pedals on opposite sides of the body and supported at different points by the cranks on such side, and gearing connecting the crank shafts and the rear axle whereby said pedals are operable to rotate the driving axle without being rotatable with respect to the vehicle, the body forming an overlying shield for the said gearing.

10. In a foot-propelled child's vehicle, a pedal, and a crank having a journal portion for the pedal and a flange on the said journal portion, the said pedal being journaled on the said journal portion and having a slot to accommodate the flange and to cooperate therewith in limiting movement of the pedal along the journal, said pedal presenting an upward offset so that its vertical throw will not be intercepted by an axle of the vehicle.

11. In a foot-propelled child's vehicle, a body supported at opposite sides thereof by front and rear wheels and forming a rest for one foot, at least, of the child, and pedal means connected for driving the vehicle and adapted to rise substantially in a horizontal plane with the top of the body so that the weight of the child may be shifted from the rest to the pedal means, or from the latter to the rest.

12. In a foot-propelled child's vehicle, a body forming a rest for one foot, at least of the child, wheel means bearing said body, pedal means arranged laterally of the body so that at its highest point it will be substantially at the height of said rest so that the weight of the child may be shifted from one to the other of the said rest and the said pedal means, and a driving connection from the pedal means to the wheel means.

13. In a foot-propelled child's vehicle, a body including a pair of oppositely disposed vertical walls that extend lengthwise of the vehicle, a series of transverse shafts journaled in said walls at intervals of their length, one of said shafts being a driving axle bearing wheel means for engaging the road and another being a crank shaft presenting crank means exteriorly of the lateral limits of the said pair of walls, pedal means journaled on the crank means and operable to rotate the crank shaft, and means positioned between the walls for transmitting the power of the crank shaft to the driving axle, the said walls being formed in separable sections that respectively overlie and underlie the said shafts and cooperate to embrace the latter.

14. In a foot-propelled child's vehicle, a body, a steering post journaled in the body, an axle borne by the steering post, a driving axle journaled in the body, road wheels borne by said axles, a pair of transverse crank shafts journaled in the body and presenting cranks laterally of the body, pedal means supported at different points by said cranks, and gearing connecting the crank shafts and the driving axle whereby said pedal means is operable to rotate the driving axle without being rotatable with respect to the vehicle, the body forming an overlying shield for the said gearing.

In testimony whereof I hereunto affix my signature.

WALTER R. BENJAMIN.